US009315184B2

(12) United States Patent
Shimizu et al.

(10) Patent No.: US 9,315,184 B2
(45) Date of Patent: Apr. 19, 2016

(54) BRAKING DEVICE FOR VEHICLE

(71) Applicant: ADVICS CO., LTD., Kariya (JP)

(72) Inventors: Hiroshi Shimizu, Kariya (JP);
Shigemitsu Nohira, Kariya (JP)

(73) Assignee: ADVICS CO., LTD., Kariya, Aichi-Pref (JP)

( * ) Notice: Subject to any disclaimer, the term of this patent is extended or adjusted under 35 U.S.C. 154(b) by 0 days.

(21) Appl. No.: 14/413,342

(22) PCT Filed: Jul. 11, 2013

(86) PCT No.: PCT/JP2013/069039
§ 371 (c)(1),
(2) Date: Jan. 7, 2015

(87) PCT Pub. No.: WO2014/010701
PCT Pub. Date: Jan. 16, 2014

(65) Prior Publication Data
US 2015/0151730 A1 Jun. 4, 2015

(30) Foreign Application Priority Data

Jul. 12, 2012 (JP) ................................ 2012-156149

(51) Int. Cl.
*B60T 13/14* (2006.01)
*B60T 13/16* (2006.01)
(Continued)

(52) U.S. Cl.
CPC ............... *B60T 13/168* (2013.01); *B60T 7/042* (2013.01); *B60T 8/4077* (2013.01); *B60T 13/146* (2013.01);
(Continued)

(58) Field of Classification Search
CPC ..... B60T 11/10; B60T 13/161; B60T 13/662; B60T 13/686; B60T 13/745; B60T 13/748; B60T 2270/602; B60T 2270/604

USPC ................ 303/113.4, 114.1, 115.4, 152, 155; 188/358–360; 60/547.1–547.3, 60/548–590
See application file for complete search history.

(56) References Cited

U.S. PATENT DOCUMENTS 7,309,112 B2 * 12/2007 Isono ..................... B60K 6/365
303/11
7,331,641 B2 * 2/2008 Kusano ................ B60T 8/4081
188/359
(Continued)

FOREIGN PATENT DOCUMENTS

CN 101875353 A 11/2010
CN 102248937 A 11/2011
(Continued)

OTHER PUBLICATIONS

Office Action (Notification of the First Office Action) issued on Jun. 3, 2015, by the Chinese Patent Office in corresponding Chinese Patent Application No. 201380035951.6, and an English Translation of the Office Action. (8 pages).
(Continued)

Primary Examiner — Christopher Schwartz
(74) Attorney, Agent, or Firm — Buchanan Ingersoll & Rooney PC

(57) ABSTRACT

A braking device for a vehicle includes a cylinder, a master piston having a pressure applying piston portion and a servo pressure receiving portion, an input piston, a pressure accumulating device, a pilot pressure generating device, and a regulator having a first piston slidably fitted into a housing and dividing an inside of the housing into a first pilot chamber and a servo pressure generating chamber, a valve mechanism connecting the servo pressure generating chamber with the pressure accumulating device or a reservoir in response to movement of the first piston, and a second piston fitted into the housing and dividing the inside of the housing into the first pilot chamber and a second pilot chamber, wherein the second piston is formed so that an end surface thereof exposed to the first pilot chamber has a larger pressure-receiving surface area than an end surface exposed to the second pilot chamber.

3 Claims, 5 Drawing Sheets

(51) Int. Cl.
  *B60T 7/04* (2006.01)
  *B60T 13/66* (2006.01)
  *B60T 13/68* (2006.01)
  *B60T 17/22* (2006.01)
  *B60T 8/40* (2006.01)

(52) U.S. Cl.
  CPC ............. *B60T 13/161* (2013.01); *B60T 13/662* (2013.01); *B60T 13/686* (2013.01); *B60T 17/22* (2013.01); *B60T 2270/414* (2013.01)

(56) References Cited

U.S. PATENT DOCUMENTS 8,342,615 B2 * 1/2013 Drumm ................. B60T 8/4077
 188/152
9,004,617 B2 * 4/2015 Ishida .................... B60T 7/042
 303/114.1
2010/0275593 A1 11/2010 Okada et al.
2011/0285199 A1 * 11/2011 Ishida .................... B60T 7/042
 303/3
2014/0327296 A1 11/2014 Ishida

FOREIGN PATENT DOCUMENTS

| JP | 11-20663 A | 1/1999 |
| JP | 11-180290 A | 7/1999 |
| JP | 2006-69301 A | 3/2006 |
| JP | 2011-240873 A | 12/2011 |

OTHER PUBLICATIONS

International Search Report (PCT/ISA/210) mailed on Oct. 1, 2013, by the Japanese Patent Office as the International Searching Authority for International Application No. PCT/JP2013/069039.

* cited by examiner

BRAKING DEVICE FOR VEHICLE

TECHNICAL FIELD

This invention relates to a braking device for a vehicle which applies friction braking force to the vehicle.

BACKGROUND ART

A braking device for a vehicle illustrated in FIGS. 11 and 12 of Patent Literature 1 is known as an example of a braking device for a vehicle which applies friction braking force to the vehicle. An input piston and a master piston are retained inside a master cylinder of the known braking device for the vehicle while keeping a predetermined distance therebetween. When the input piston is moved, requested braking force is calculated on the basis of movement of the input piston, and requested friction braking force is calculated by subtracting requested regeneration braking force from the requested braking force. Then, a servo pressure generated based on the requested friction braking force acts on the master piston and moves the master piston. In response to movement of the master piston, a master pressure is generated in a master chamber. The master pressure is applied to wheel cylinders, thereby generating the requested friction braking force. According to the known technology disclosed in Patent Literature 1, the master pressure and the servo pressure are controlled to be in a ratio of 1:1. More specifically, the servo pressure is generated in such a manner that firstly a pilot pressure having the same level of pressure as the servo pressure is generated by an electric pilot-pressure-generating portion on the basis of the requested friction braking force. The pilot pressure generated in the above mentioned manner is applied to a second pilot hydraulic pressure chamber, which is formed between a first pressure control piston and a second pressure control piston of a regulator and acts on the first pressure control piston, thereby only the first pressure control piston is moved for a predetermined distance. Accordingly, a valve, which interrupts a communication between a high pressure port and a pressure accumulating chamber, is opened and the servo pressure corresponding to the requested friction braking force is generated at the high pressure port. Furthermore, the master pressure is applied to a pilot hydraulic pressure chamber, which is provided at an end surface side of the second pressure control piston opposite to the second pilot hydraulic pressure chamber. According to the above described configuration, for example even when a power system is in failure and the pilot pressure is not applied to the second pilot hydraulic pressure chamber, the master pressure generated in response to depression of a brake pedal by a vehicle operator allows the first pressure control piston and the second pressure control piston to be operated in conjunction and open the valve, so that the servo pressure is applied to a servo pressure chamber in order to generate the braking force.

CITATION LIST

Patent Literature

Patent Literature 1: JP2011-240873 A

SUMMARY OF INVENTION

Technical Problems to be Solved by Invention

According to the braking device for the vehicle disclosed in Patent Literature 1 (FIGS. 11 and 12), when the vehicle operator releases the braking pedal from a depression operation, the input piston and the master piston move in a return direction, i.e. the input piston and the master piston move to original positions before the brake pedal is depressed. While the master piston is moved, a sliding friction acting in a direction opposite to the moving direction of the master piston is generated between the master piston and a cylinder inner circumferential surface, which receives the master piston. Accordingly, while a transitional state, i.e. in a process of releasing the brake pedal, a pressure reducing speed of the master pressure may become slower than the pressure reducing speed of the pilot pressure, which is not interfered by any resistance from any components, because of the structure of the braking device for the vehicle. Therefore, in the case of the known technology disclosed in Patent Literature 1 in which the master pressure and the pilot pressure are controlled to be equal to one another, the master pressure may become greater than the pilot pressure. In this case, because pressure receiving diameters of the end surfaces of the second pressure control piston exposed to the second pilot hydraulic pressure chamber and the pilot hydraulic pressure chamber respectively are set to be the same, the second pressure control piston may be pressed to move towards the first pressure control piston by the pressure difference between the master pressure and the pilot pressure, which may result in influencing a property of the servo pressure to be generated.

Accordingly, this invention was made in consideration with the above-mentioned situation and an object of the invention is to provide a braking device for a vehicle which can generate a servo pressure applied to a master cylinder by a master pressure generated in response to a depressing operation to a brake pedal by a vehicle operator, wherein the servo pressure can be stably generated even when the master pressure becomes greater than the pilot pressure such as while a power system is in failure and the like.

Solutions to the Problem(s)

The braking device for a vehicle according to a first aspect of the invention made for solving the above-mentioned problems is characterized in that the braking device includes a cylinder, a master piston provided inside the cylinder while being allowed to be slidably movable therein in an axial direction and having a pressure applying piston portion defining a master chamber, in which a brake fluid is pressurized, with an inner circumferential surface of the cylinder, and a servo pressure receiving portion defining a servo pressure chamber with the inner circumferential surface of the cylinder, an input piston arranged inside of the cylinder at a rear-side thereof while being allowed to be slidably movable in the axial direction and to be distanced away from a rear end surface of the master piston for a predetermined distance, a pressure accumulating device accumulating a pressure of the brake fluid, a pilot pressure generating device generating a pilot pressure corresponding to an operation amount of the input piston by using the brake fluid of the pressure accumulating device, and a regulator having a first piston fitted into a housing while being allowed to be slidably movable therein and dividing an inside of the housing into a first pilot chamber in communication with the pilot pressure generating device and a servo pressure generating chamber in communication with the servo pressure chamber, a valve mechanism that is configured to connect the servo pressure generating chamber with the pressure accumulating device or a reservoir in response to a movement of the first piston, and a second piston fitted into the housing while being allowed to contact and detach from the first piston and dividing the inside of the housing into the first pilot chamber and a second pilot chamber in communication with the master chamber, wherein the second piston is formed so that an end surface thereof exposed to the first pilot chamber has a larger pressure-receiving surface area than an end surface exposed to the second pilot chamber.

The invention according to a second aspect is characterized in that in addition to the feature of the first aspect, wherein a difference between a pressure-receiving surface area of the end surface of the second piston exposed to the first pilot chamber and a pressure-receiving surface area of the end surface of the second piston exposed to the second pilot chamber is set so that the second piston is not moved toward the first piston even when the master pressure becomes greater than the pilot pressure due to a movement of the master piston in a direction by which the master pressure is reduced and due to an influence of a sliding friction generated between the master piston and the cylinder.

The invention according to a third aspect is characterized in that in addition to the feature of the first or the second aspect, the regulator includes, a first case formed in a bottomed cylinder shape having an opening at one end thereof, and accommodating therein the second pilot chamber, the second piston, the first pilot chamber and the first piston in this order from a bottom surface of the first case, and a second case fixed at the opening of the first case, defining the servo pressure generating chamber together with the first case and the first piston, and having the valve mechanism inside of the second case, wherein the first and second cases are formed as a unit and assembled inside of the housing.

According to the regulator of the braking device for the vehicle associated with the invention of the first aspect, the end surface of the second piston exposed to the first pilot chamber, to which the pilot pressure is applied, is formed to have the larger pressure-receiving surface area than the end surface of the second piston exposed to the second pilot chamber, to which the master pressure is applied. Accordingly even when a phenomenon such as the master pressure becoming greater than the pilot pressure occurs, the second piston is not likely to be moved toward the first piston by the pressure difference between the master pressure and the pilot pressure, and therefore the generation of the servo pressure is not likely to be disturbed.

According to the invention associated with the second aspect, the difference between the pressure-receiving surface area of the end surface of the second piston exposed to the first pilot chamber and the pressure-receiving surface area of the end surface of the second piston exposed to the second pilot chamber is set so that the second piston is not displaced toward the first piston even when the phenomenon such as the master pressure becoming greater than the pilot pressure occurs. Accordingly, the second piston is avoided from being moved toward the first piston by the pressure difference between the master pressure and the pilot pressure, therefore the generation of the servo pressure is not likely to be disturbed.

According to the invention associated with the third aspect, the first piston, the second piston and the like configuring the regulator are assembled to the first and second cases to form a unit. The unit is inserted into the housing, thereby forming the regulator. Accordingly, the regulator is easily assembled, which may contribute to reduce manufacturing costs.

BRIEF EXPLANATION OF ATTACHED DRAWINGS

EMBODIMENTS OF INVENTION

The embodiment of the invention will be explained hereinafter in reference to the attached drawings. A hybrid vehicle (which is hereinafter referred to simply as a vehicle), in which a friction brake device BK (a braking device for a vehicle) is installed, is a vehicle in which plural drive wheels, for example, front left and front right wheels Wfl and Wfr, are driven by an engine and a motor/generator (not shown). A regeneration brake device is formed by the motor/generator. The regeneration brake device generates regeneration braking force based on "target regeneration braking force", which will be explained below in detail, at the front left and front right wheels Wfl and Wfr by the motor/generator. The motor/generator may be configured separately with a motor and a generator.

In the vicinity of each vehicle wheel Wfl, Wfr, Wrl and Wrr, a brake disc (not shown) which rotates unitary with each corresponding wheel Wfl, Wfr, Wrl and Wrr and a friction brake (not shown) which generates friction braking force by pressing a brake pad onto the brake disc are provided. Each friction brake is equipped with each corresponding wheel cylinder WCfl, WCfr, WCrl and WCrr which pushes the brake pad onto the brake disc by a master pressure Pm generated by a master cylinder 10 (see FIG. 1), which will be explained below in detail. While the above-mentioned operation is executed, a target friction braking force is calculated by a brake ECU 2, which will be explained below, in such a manner that the above-mentioned target regeneration braking force is subtracted from a target braking force, which is set on the basis of a depression amount of a brake pedal 4 (see FIG. 1) depressed by a vehicle operator.

Figure 1:
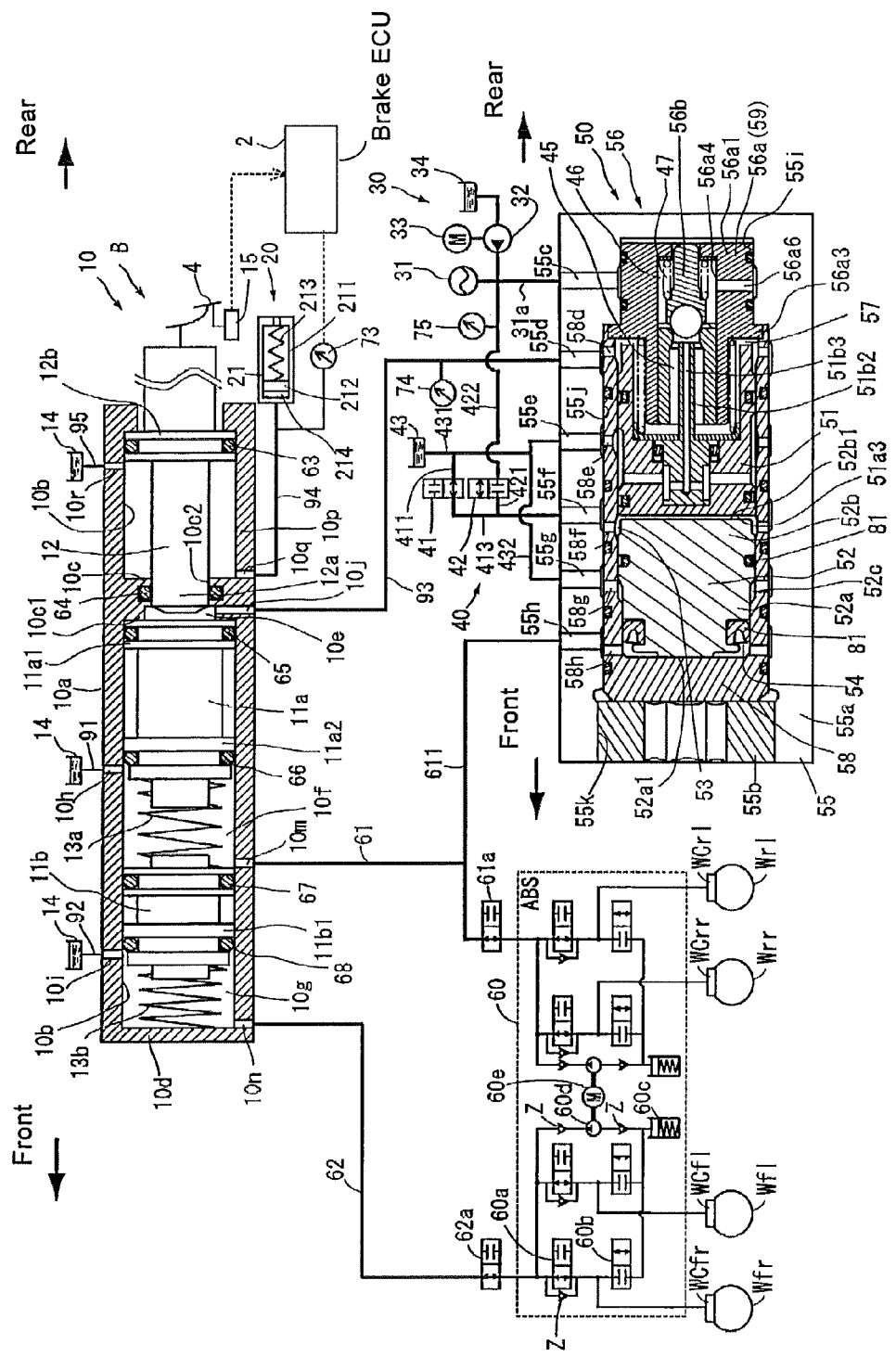
FIG. 1 is a partial sectional view illustrating a configuration of a braking device for a vehicle according to an embodiment.

As illustrated in FIG. 1, the friction brake device BK (the braking device for the vehicle) according to this embodiment mainly includes the master cylinder 10, a reaction force generating device 20, a pressure accumulating device 30, a pilot pressure generating device 40, a regulator 50, an ABS 60, the brake ECU 2, and various type sensors 15 and 73 through 75 which are to be in communication with the brake ECU 2. A servo pressure generating device, which generates a servo pressure Ps, is formed by the pressure accumulating device 30, the pilot pressure generating device 40, the regulator 50 and the like.

As illustrated in FIG. 1, the master cylinder 10 includes a cylinder 10a formed in a substantially bottomed cylinder shape having an opening at a right end thereof in FIG. 1, an input piston 12, a first master piston 11a, a second master piston 11b, a reaction force chamber 10p, a servo pressure chamber 10e, a first master chamber 10f, a spring 13a, a spring 13b and a second master chamber 10g, which are accommodated within the cylinder 10a. Hereinafter, the master cylinder 10 will be explained with the left side of the master cylinder 10 in FIG. 1 as the front side and the right side of the master cylinder 10 in FIG. 1 as the rear side.

The input piston 12 is configured to slidably reciprocate inside the cylinder 10a in an axial direction thereof only for an amount corresponding to an operation amount of the brake pedal 4 in order to increase/decrease a volume of the reaction force chamber 10p. The reaction force chamber 10p is defined and formed by the inner circumferential surface of the cylinder 10a (a cylinder bore 10b), a partition 10c and a flange portion 12b of the input piston 12, which are provided inside the cylinder 10a. A seal member 63 made by, such as, a rubber O-ring and the like, is provided between the outer circumference of the flange portion 12b and the cylinder bore 10b, so that a clearance formed between the cylinder bore 10b and the flange portion 12b of the input piston 12 is fluid-tightly sealed.

An end portion 12a located at the front end of the input piston 12 is fluid-tightly supported by a through hole 10c2 formed at the center portion of the partition 10c by means of a seal member 64 made by, for example, a rubber O-ring and the like, and is arranged at a location rearward of the rear end surface of the first master piston 11a while allowing the input piston 12 to be slidably movable in the axial direction. The end portion 12a protrudes into the servo pressure chamber 10e and is arranged so as to be contactable with the rear end surface of the first master piston 11a and detachable therefrom for a predetermined distance. As the input piston 12 moves forward in response to the operation of the brake pedal 4, the flange portion 12b also moves forward, thereby the volume of the reaction force chamber 10p is decreased.

When the servo pressure Ps is applied to the servo pressure chamber 10e while the above-mentioned operation is executed, a state in which the volume of the servo pressure chamber 10e does not change is maintained. Accordingly, a servo pressure receiving portion 11a1 of the first master piston 11a receives the servo pressure Ps and the first master piston 11a starts moving forward while keeping a distance between the rear end surface of the first master piston 11a and the front end surface of the end portion 12a of the input piston 12. On the other hand, in the case where the servo pressure Ps is not applied to the servo pressure chamber 10e, the volume of the servo pressure chamber 10e is decreased and the front end surface of the end portion 12a of the input piston 12 contacts the rear end surface of the first master piston 11a, accordingly the input piston 12 pushes and moves the first master piston 11a forward.

As illustrated in FIG. 1, the first master chamber 10f (which corresponds to a master chamber of the invention) is defined and formed by a pressure applying piston portion 11a2 of the first master piston 11a, a rear piston portion 11b2 of the second master piston 11b and the cylinder bore 10b (the inner circumferential surface of the cylinder 10a). The master pressure Pm is generated in the first master chamber 10f in such a manner that brake fluid is pressurized as the first master piston 11a is moved forward.

The second master chamber 10g is defined and formed by a pressure applying piston portion 11b1 of the second master piston 11b, a bottom wall 10d of the cylinder 10a and the cylinder bore 10b (the inner circumferential surface of the cylinder 10a). The master pressure Pm is generated in the second master chamber 10g in such a manner that the brake fluid is pressurized as the second master piston 11b is moved forward.

The spring 13a is provided inside the first master chamber 10f while in a compressed state, more specifically the spring 13a is provided between the first master piston 11a and the second master piston 11b. The spring 13a biases the first master piston 11a and the second master piston 11b in a direction by which the first master chamber 10f is enlarged. The spring 13b is provided inside the second master chamber 10g while in a compressed state, more specifically the spring 13b is provided between the second master piston 11b and the bottom wall 10d. The spring 13b biases the second master piston 11b in a direction by which the second master chamber 10g is enlarged.

As illustrated in FIG. 1, plural ports 10h through 10j, ports 10m, 10n, 10q and port 10r, which connect inside and outside of the cylinder 10a, are formed at the cylinder 10a of the master cylinder 10. The port 10h connects the first master chamber 10f with a reservoir 14, which is in the level of the atmospheric pressure, via a conduit 91. The port 10i connects the second master chamber 10g with the reservoir 14 via a conduit 92. The ports 10h and 10i are formed at locations forward of the first master piston 11a and the second master piston 11b at a predetermined positions, respectively. More specifically, the ports 10h and 10i are arranged so as to open at locations in the vicinity of immediately forward of front ends of seal members 66 and 68, which are made by for example the rubber O-rings and which fluid-tightly seal the clearance between the first master piston 11a and the cylinder bore 10b (the inner circumferential surface of the cylinder 10a) and the clearance between the second master piston 11b and the cylinder bore 10b, respectively. The predetermined position of the second master piston 11b indicates a position where the second master piston 11b remains still because of being balanced by the biasing force applied from the spring 13a and the spring 13b in the opposite direction while a hydraulic pressure is not applied to the servo pressure chamber 10e (for example, while the brake pedal 4 is not depressed). The predetermined position of the first master piston 11a indicates a position where the first master piston 11a remains still while the first master piston 11a is biased by the spring 13a in the rearward direction and the rear end surface of the first master piston 11a contacts a stepped portion 10c1 (see FIG. 1).

As described above, because the port 10h and the port 10i are arranged at the locations in the vicinity of immediately forward of the front ends of the respective first master piston 11a and the second master piston 11b while the first master piston 11a and the second master piston 11b are located at the predetermined positions, when the first master piston 11a and the second master piston 11b start moving forward, the port 10h and the port 10i are closed by the respective seal members 66 and 68 immediately after the first master piston 11a and the second master piston 11b start moving, so that the first master chamber 10f and the second master chamber 10g are disconnected from the reservoir 14.

The port 10j connects the servo pressure chamber 10e with a servo pressure generating chamber 57 of the regulator 50 via a conduit 93. The port 10m connects the first master chamber 10f with the wheel cylinders WCrr and WCrl via a conduit 61 and the ABS 60. The port 10n connects the second master chamber 10g with the wheel cylinders WCfr and WCfl via a conduit 62 and the ABS 60.

The ports 10q and 10r are formed at locations rearward of the partition 10c and extend into the cylinder bore 10b. The port 10q is in communication with the reaction force generating device 20 via a conduit 94. The port 10r is arranged so as to open at a location immediately forward of the front end of the flange portion 12b of the input piston 12 and connects the reaction force chamber 10p with the reservoir 14 via a conduit 95 while the brake pedal 4 is not depressed. More specifically, the port 10r is arranged so as to open at a location immediately forward of the front end of the seal member 63, which fluid-tightly seals the clearance formed between the outer circumference of the flange portion 12b and the cylinder bore 10b (the inner circumferential surface of the cylinder 10a). Accordingly, when the brake pedal 4 is depressed and the input piston 12 is moved forward by a predetermined amount, the opening of the port 10r opening to the reaction force chamber 10p is closed by the seal member 63, thereby the reaction force chamber 10p is disconnected from the reservoir 14.

A stroke sensor 15, which is provided in the vicinity of the brake pedal 4, detects the operation amount (i.e. the depression amount) of the brake pedal 4 and transmits the detection result to the brake ECU 2. Since the brake pedal 4 is connected to the rear end of the input piston 12, the stroke sensor 15 eventually detects the movement amount (the operation amount) of the input piston 12 in the axial direction thereof.

The reaction force generating device 20 is provided with a stroke simulator 21. The stroke simulator 21 is a device for generating reaction force at the reaction force generating chamber 10p in response to the operation of the brake pedal 4 and reproduces a brake operation feeling (depression feeling) of a normal braking device. Generally, the stroke simulator 21 is configured in such a manner that a piston 212 is fitted into a cylinder 211 while being allowed to be slidably movable therein and a pilot hydraulic chamber 214 is formed at a location forward of the piston 212, which is biased in the forward direction by a compression spring 213. The stroke simulator 21 is connected to the reaction force chamber 10p via the conduit 94 and the port 10q.

Accordingly, when the brake pedal 4 is depressed, the input piston 12 is moved forward and the port 10r is closed, thereby the reaction force chamber 10p and the reservoir 14 are disconnected from one another. Then, the brake fluid flows into the stroke simulator 21 from the reaction force chamber 10p in response to the movement of the input piston 12, and the stroke simulator 21 generates the reaction force corresponding to the stroke amount in the reaction force chamber 10p. In other words, the stroke simulator 21 applies the reaction force corresponding to the operation amount (the operation amount of the brake pedal 4), which corresponds to the stroke amount of the input piston 12, to the brake pedal 4 connected to the input piston 12.

A pressure sensor 73 detects mainly the hydraulic pressure (the reaction force) of the reaction force chamber 10p and is connected to the conduit 94. A signal from the pressure sensor 73 is transmitted to the brake ECU 2.

The servo pressure generating device is configured mainly with the pressure accumulating device 30, the pilot pressure generating device 40 and the regulator 50. The pressure accumulating device 30 supplies the brake fluid in high pressure to the regulator 50 on the basis of instructions from the brake ECU 2. The pressure accumulating device 30 includes mainly an accumulator 31, a hydraulic pressure pump 32, a motor 33 and a reservoir 34 in the level of the atmospheric pressure.

The accumulator 31 accumulates the hydraulic pressure generated by the hydraulic pressure pump 32. The accumulator 31 is connected to the regulator 50, the pressure sensor 75 and the hydraulic pressure pump 32 by means of a conduit 31a. The hydraulic pressure pump 32 is connected to the motor 33 and the reservoir 34, so that the hydraulic pressure pump 32 supplies the brake fluid, which is stored in the reservoir 34, to the accumulator 31 as the motor 33 is activated. The pressure sensor 75 detects the hydraulic pressure of the accumulator 31.

When the pressure sensor 75 detects that an accumulator pressure decreases to a value equal to or lower than a predetermined value, the motor 33 is activated on the basis of a control signal from the brake ECU 2 and the hydraulic pressure pump 32 supplies the brake fluid to the accumulator 31 in order to supply a pressure energy to the accumulator 31.

The pilot pressure generating device 40 supplies the pilot pressure Pp generated to have a predetermined pressure level to the regulator 50 so that the regulator 50 can generate the servo pressure Ps (in this embodiment, the pilot pressure Pp is controlled to be in the same level of pressure as the servo pressure Ps). As described above, the level of the predetermined pilot pressure Pp (=servo pressure Ps), which is applied to the regulator 50 by the pilot pressure generating device 40, is calculated and determined by the brake ECU 2 on the basis of the target friction braking force.

The pilot pressure generating device 40 includes a pressure reducing valve 41 and a pressure increasing valve 42. The pressure reducing valve 41 is a normally-open-type electromagnetic valve. One port of the pressure reducing valve 41 is connected to a reservoir 43, which is in the level of the atmospheric pressure, via a conduit 411 and the other port of the pressure reducing valve 41 is connected to a conduit 413. The pressure reducing valve 41 is controlled by the brake ECU 2, more specifically the opening area of the flow passage is linearly controlled, thereby the hydraulic pressure of the flow passage at the downstream is controlled.

The pressure increasing valve 42 is a normally-closed-type electromagnetic valve. One port of the pressure increasing valve 42 is connected to a conduit 422 so that the pressure increasing valve 42 is in communication with the pressure accumulating device 30. The other port of the pressure increasing valve 42 is connected to a conduit 421, which is connected to the conduit 413. The pressure increasing valve 42 is controlled by the brake ECU 2, more specifically, the opening area of the flow passage is linearly controlled, thereby the hydraulic pressure of the flow passage at the downstream being controlled.

Figure 2:
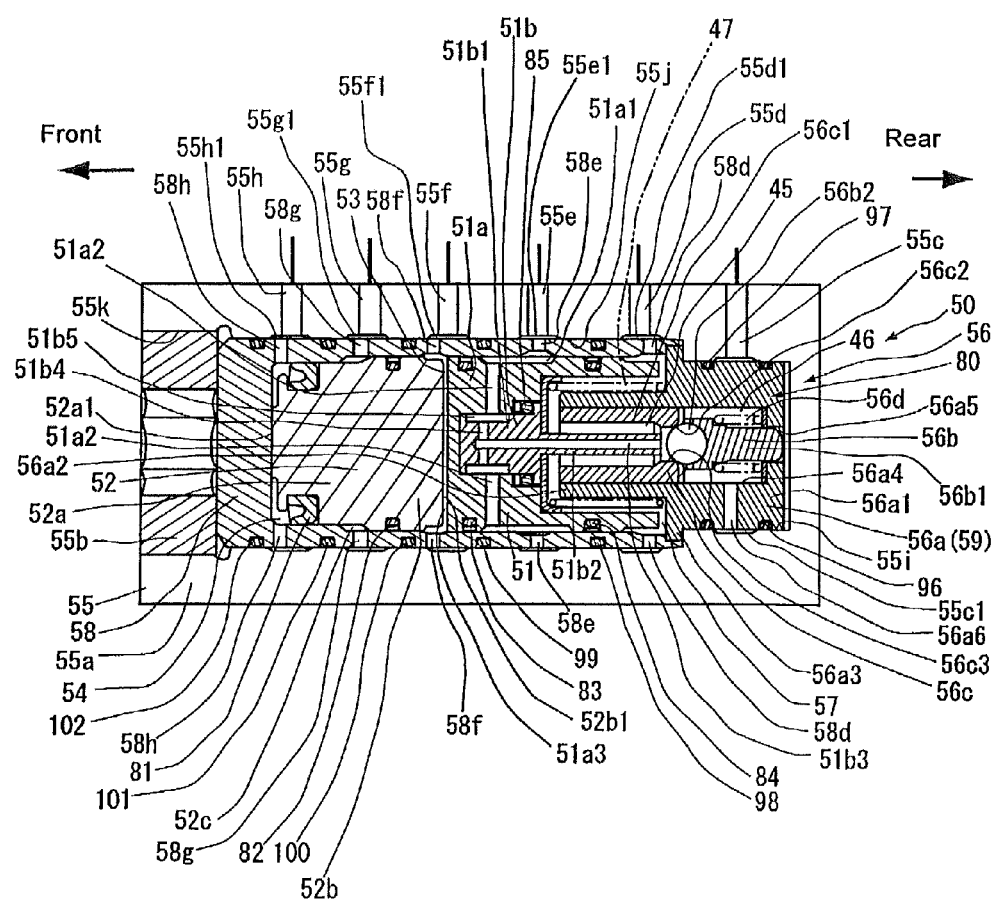
FIG. 2 is a cross sectional view illustrating a configuration of a regulator according to the embodiment.

The regulator 50 is configured to adjust the hydraulic pressure of the servo pressure chamber 10e of the master cylinder 10 mainly by applying/releasing the pilot pressure Pp to/from a first pilot chamber 53. As illustrated in FIGS. 1 and 2, the regulator 50 includes mainly a housing 55, a first piston 51, a second piston 52, the first pilot chamber 53, a second pilot chamber 54, a valve mechanism 56 and the servo pressure generating chamber 57. In this embodiment, the second pilot chamber 54, the second piston 52, the first pilot chamber 53 and the first piston 51 are arranged in alignment within a first case 58, which is formed as a substantially bottomed cylinder member having a bottom surface at the front side thereof, in this order from the bottom surface of the first case 58. The valve mechanism 56 is configured within a second case 59, which serves also as a valve housing 56a of the valve mechanism 56, and fixed at the opening of the first case 58. The first case 58 and the housing 55 correspond to a housing of the invention.

The first case 58 and the second case 59, which are unitary fixed with one another, form a subassembly 80. In this case, the servo pressure generating chamber 57 is defined by a space surrounded by the first case 58 and the second case 59. The regulator 50 is formed in such a manner that the subassembly 80 is inserted into the housing 55, and the opening of the housing 55 is screwed and closed by a lid member 55b, which will be explained below. The regulator 50 will be explained in detail below with the left side of the regulator 50 in FIGS. 1 and 2 as the front side and the right side of the regulator 50 in FIGS. 1 and 2 as the rear side.

The housing 55 includes a housing body 55a, which is formed as a substantially bottomed cylinder member having a bottom surface at the rear end thereof, and the lid member 55b, which is screwed onto the opening of the housing body 55a located at the front side thereof so as to close the opening and presses the subassembly 80 to the bottom surface of the housing body 55a in such a manner that the rear end surface of the lid member 55b contacts the front end surface of the subassembly 80. In this embodiment, the lid member 55b is formed as a screw having an inner hexagon socket. Plural ports 55c through 55h, which connect the inside and outside of the housing 55, are formed at the housing body 55a.

The port 55c is connected to the conduit 31a. The port 55d is connected to the conduit 93. The port 55e is connected to a conduit 431, which is in communication with the reservoir 43. The port 55f is connected to the conduit 413. The port 55g is connected to a conduit 432, which is connected to the conduit 431. The port 55h is connected to a conduit 611, which diverges from the conduit 61.

The inside of the housing body 55a is defined by a small-diameter portion 55i, into which the valve mechanism 56 of the subassembly 80 is accommodated, an intermediate-diameter portion 55j, into which the first case 58 of the subassembly 80 is accommodated, and a large-diameter screw portion 55k, onto which the lid member 55b is screwed, in this order from the bottom surface of the housing body 55b.

A communication passage 55c1 having a predetermined width in the axial direction of the housing body 55a is formed so as to circumferentially extend along the inner circumferential surface of the small-diameter portion 55i at a location where the port 55c opens. Communication passages 55d1, 55e1, 55f1, 55g1 and 55h1, each of which has a predetermined width in the axial direction of the housing body 55a, are formed so as to circumferentially extend along the inner circumferential surface of the intermediate-diameter portion 55j at locations where the corresponding ports 55d through 55h open. The first case 58 is inserted into the intermediate-diameter portion 55j of the housing body 55a from the opening of the first case 58.

As described above, the first piston 51 divides the inside of the first case 58 into the first pilot chamber 53 and the servo pressure generating chamber 57, which is in communication with the servo pressure chamber 10e (see FIGS. 1 and 2), and the second piston 52 is fitted into the inside of the first case 58 while being allowed to contact/detach with/from the first piston 51 and divides the inside of the first case 58 into the first pilot chamber 53 and the second pilot chamber 54, which is in communication with the first master chamber 10f.

Plural ports 58d through 58h are formed at the first case 58 in order to establish a communication between the inside and outside of the first case 58. The port 58d connects the communication passage 55d1 formed on the inner circumferential surface of the housing body 55a with the servo pressure generating chamber 57 while the first case 58 is arranged inside of the housing body 55a. The port 58e connects the communication passage 55e1 formed on the inner circumferential surface of the housing body 55a with a communication passage 51a1 (an atmospheric pressure chamber). The port 58f connects the communication passage 55f1 formed on the inner circumferential surface of the housing body 55a with the first pilot chamber 53.

The port 58g establishes the communication between the communication passage 55g1 formed on the inner circumferential surface of the housing body 55a and an intermediate atmospheric pressure chamber 52c illustrated in FIG. 2. The port 58h establishes the communication between the communication passage 55h1 formed on the inner circumferential surface of the housing body 55a and the second pilot chamber 54. In this embodiment, each of the ports 58d through 58h is formed as a pair that are located 180 degrees apart from one another along the outer circumference of the first case 58. Alternatively, only one port may be formed as each of the ports 58d through 58h on the outer circumference of the first case 58 as long as a necessary flow is obtained, or three or more ports may be formed for each of the ports 58d through 58h.

The second pilot chamber 54 is defined and formed by the bottom surface of the first case 58, the inner circumferential surface of the first case 58 and the second piston 52. The second pilot chamber 54 is connected to the conduit 611 via the port 58h, the communication passage 55h1 and the port 55h, so that the second pilot chamber 54 is in communication with the first master chamber 10f of the master cylinder 10.

Figure 3:
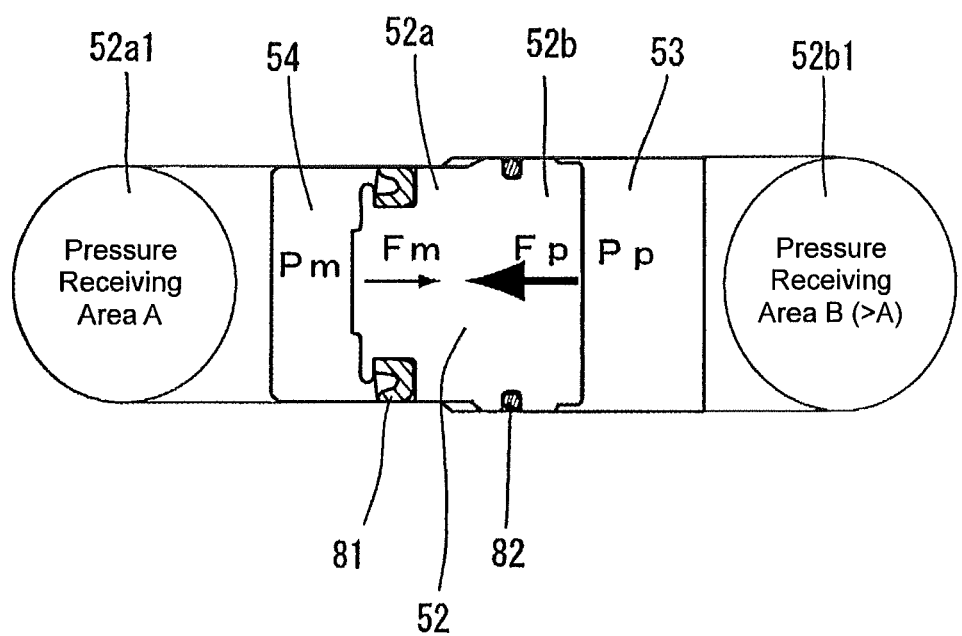
FIG. 3 is a schematic diagram for explaining biasing force Fm and Fp applied to a second piston in FIG. 2.

The second piston 52 is formed in a stepped columnar shape wherein the outer circumferential surface of the second piston 52 has a large diameter and a small diameter. The second piston 52 is fitted onto the inner circumferential surface of the first case 58 while being allowed to be slidably movable in the axial direction. As illustrated in FIG. 2 and FIG. 3 in which a schematic diagram of the second piston 52 is illustrated, a small-diameter columnar portion 52a, which is provided at a location close to the bottom surface (at the front side) of the first case 58, is formed so that an end surface 52a1 having a pressure-receiving surface area A is exposed to the second pilot chamber 54. A large-diameter columnar portion 52b, whose diameter is larger than the small-diameter columnar portion 52a, is formed so that an end surface 52b1 having a pressure-receiving surface area B is exposed to the first pilot chamber 53.

Seal members 81 and 82 are provided at the small-diameter columnar portion 52a and the large-diameter columnar portion 52b, respectively, so that clearances between the inner circumferential surface of the first case 58 on one hand and the small-diameter columnar portion 52a and the large-diameter columnar portion 52b on the other hand are fluid-tightly sealed. Accordingly, the end surface 52a1 of the small-diameter columnar portion 52a receives the hydraulic pressure of the second pilot chamber 54, i.e. the master pressure Pm of the first master chamber 10f, so that the second piston 52 is biased toward the first piston 51 by biasing force Fm (=Pm*A). The end surface 52b1 of the large-diameter columnar portion 52b receives the pilot pressure Pp of the first pilot chamber 53 generated by the pilot pressure generating device 40, thereby the second piston 52 is biased toward the bottom surface of the first case 58 by biasing force Fp (=Pp*B). In this embodiment, the master pressure Pm and the pilot pressure Pp are controlled to be in the same level of pressure.

However, as described below in an explanation of function of the braking device for the vehicle, a state in which the master pressure Pm becomes greater than the pilot pressure Pp (master pressure Pm>pilot pressure Pp) may occur for example when the vehicle operator releases the brake pedal 4 from depressing. In this case, the relationship between the biasing force Fm and Fp becomes such that the biasing force Fm is greater than the biasing force Fp (biasing force Fm>biasing force Fp), which may result in the second piston 52 to be unintentionally moved toward the first piston 51 and influencing the generation of the servo pressure Ps. According to the invention, the pressure-receiving surface area A of the small-diameter columnar portion 52a and the pressure-receiving surface area B of the large-diameter columnar portion 52b, i.e. the outer diameters of the small-diameter columnar portion 52a and the large-diameter columnar portion 52b are appropriately set so that the biasing force Fm becomes smaller than the biasing force Fp (biasing force Fm<biasing force Fp) as illustrated in FIG. 3 even in the above-mentioned case.

According to the invention, in the case where the master pressure Pm becomes equal to or smaller than the pilot pressure Pp (master pressure Pm≤pilot pressure Pp), the relationship between the biasing force Fm and Fp becomes such that the biasing force Fm is smaller than the biasing force Fp (biasing force Fm<biasing force Fp) as illustrated in FIG. 3, so that the second piston 52 is biased toward the bottom surface of the first case 58 and therefore the second piston 52 is not moved, as a result no influence interferes with the generation of the servo pressure Ps.

The inner circumferential surface of the first case 58 is also formed in a stepped shape in order to fluid-tightly fit the second piston 52 onto the inner circumferential surface of the first case 58. In other words, the first case 58 is formed so that the inner circumferential surface of a portion of the first case 58 located closer to the bottom surface thereof has a small inner diameter in order to correspond to the small-diameter columnar portion 52a of the second piston 52, and the inner diameter of the other portion of the first case 58 is formed to be large in order to correspond to the large-diameter columnar portion 52b of the second piston 52. However, the position of the stepped portion of the inner circumferential surface of the first case 58 is formed at a location displaced from the location of the stepped portion of the second piston 52 toward the opening portion of the first case 58 while the second piston 52 is provided inside the first case 58 in a state in which the end surface of the second piston 52 contacts the bottom surface of the first case 58, thereby the above-mentioned intermediate atmospheric pressure chamber 52c is formed between the second piston 52 and the inner circumferential surface of the first case 58. In other words, the intermediate atmospheric pressure chamber 52c is formed between the seal member 81 and the seal member 82. The intermediate atmospheric pressure chamber 52c is in communication with the port 58g of the first case 58. The port 58g is in communication with the reservoir 43 via the communication passage 55g1 and the port 55g.

The first piston 51 is arranged coaxially to the second piston 52 and is fluid-tightly fitted onto the inner circumferential surface of the first case 58 while being allowed to be slidably movable in the axial direction. The first piston 51 includes mainly a body portion 51a and a control piston 51b, which is press-fitted into the inside of the body portion 51a. The body portion 51a is formed in a bottomed cup shape. The outer diameter of the cylinder portion of the first piston 51 is formed to be the same as the outer diameter of the large-diameter columnar portion 52b of the second piston 52. Furthermore, the first piston 51 is arranged so that a front end surface 51a3 of the body portion 51a faces the rear end surface 52b1 of the second piston 52. Accordingly, the first pilot chamber 53 is defined and formed by the front end surface 51a3, the rear end surface 52b1 and the inner circumferential surface of the first case 58.

The outer circumferential surface of the body portion 51a is provided with seal members 83 and 84 at a location close to the first pilot chamber 53 and a location close to the opening of the first case 58, respectively, so that a clearance formed between the outer circumferential surface of the body portion 51a and the inner circumferential surface of the first case 58 is fluid-tightly sealed. The aforementioned communication passage 51a1 is provided between the seal members 83 and 84 and is in communication with the port 58e formed at the first case 58.

The control piston 51b includes a main body portion 51b1 formed in a substantially columnar shape and a projection portion 51b2 formed in a substantially columnar shape having a smaller diameter than the main body portion 51b1 and projecting from the column axis center of the main body portion 51b1. The outer circumferential surface of the main body portion 51b1 of the control piston 51b is fitted onto the inner circumferential surface of the body portion 51a via a seal member 85, so that the main body portion 51b1 is movable in the axial direction unitary with the body portion 51a.

A passage 51b3 is bored to extend from the end portion of the projection portion 51b2 in the column axial direction of the main body portion 51b1 and the projection portion 51b2 while not penetrating through the main body portion 51b1. A passage 51b4 is formed inside the main body portion 51b1 in such a manner that the passage 51b4 extends orthogonally to the passage 51b3 and extends in the circumferential direction (in the up-and-down direction in FIGS. 1 and 2) so that the passage 51b4 opens at the outer circumferential surface of the main body portion 51b1. Further, a communication passage 51b5 is formed to extend along the entire outer circumferential surface of the main body portion 51b1 so that the passage 51b5 is connected to the passage 51b4. A passage 51a2 is formed so as to extend in the circumferential direction (in the up-and-down direction in FIGS. 1 and 2) of the body portion 51a so that the passage 51a2 connects the communication passage 51b5 with the communication passage 51a1, which is formed on the outer circumferential surface of the body portion 51a.

The cylinder outer diameter of the projection portion 51b2 is set to be smaller than an inner diameter portion 56c3 of a valve seat portion 56c, which will be explained in detail below, and is allowed to penetrate into the valve seat portion 56c. The projection portion 51b2 is arranged in a coaxial manner relative to the inner diameter portion 56c3 of the valve seat portion 56c. While the pilot pressure Pp is not supplied to the first pilot chamber 53, the end portion of the projection portion 51b2 is distanced from a ball valve 56b2 of a valve body 56b, which contacts a valve seat 56c2 and which will be explained in detail below, toward the bottom surface of the first case 58 by a predetermined distance.

The valve mechanism 56 controls opening/closing of the valve body 56b in response to the movement of the first piston 51 in order to control establishment/interruption of the communication from the servo pressure generating chamber 57 to the pressure accumulating device 30. While the communication from the servo pressure generating chamber 57 to the pressure accumulating device 30 is interrupted, the servo pressure generating chamber 57 is connected to the reservoir 43 and is controlled to be in the level of the atmospheric pressure. The valve mechanism 56 includes the valve housing 56a, which serves also as the second case 59 described above, the valve body 56b, the valve seat portion 56c and a coil spring 56d. The valve housing 56a includes a first cylinder portion 56a1 (having a large diameter) and a second cylinder portion 56a2 (having a small diameter), which are formed to have different diameters and which are formed to extend in the opposite direction while extending in a coaxial manner, and a flange portion 56a3, which is provided between the first cylinder portion 56a1 and the second cylinder portion 56a2 so as to extend from the cylinder outer circumference.

The first cylinder portion 56a1 having a bottom surface is formed to extend toward the bottom surface of the housing body 55a. The second cylinder portion 56a2 having an opening is formed to extend toward the bottom surface of the first case 58. A cylinder bore 56a4 formed inside the first cylinder portion 56a1 and the second cylinder portion 56a2 extends from the second cylinder portion 56a2 to the bottom surface of the first cylinder portion 56a1. A slide hole 56a5 pierces through the center of the bottom surface of the first cylinder portion 56a1.

Furthermore, a port 56a6 pierces the first cylinder portion 56a1 so as to extend from the outer circumferential surface of the first cylinder portion 56a1 to the cylinder bore 56a4. An opening of the port 56a6 located at the outer circumferential surface of the first cylinder portion 56a1 is in communication with the communication passage 55c1, which is formed on the inner circumferential surface of the intermediate-diameter portion 55j inside of the housing body 55a. Accordingly, the communication between the port 55c and the cylinder bore 56a4 is established.

The valve body 56b is arranged inside of the cylinder bore 56a4 at a location close to the first cylinder portion 56a1. The valve body 56b includes the ball valve 56b2, which is formed in a ball shape and which is provided at the end portion of the valve body 56b, and a valve stem 56b1, which is welded on the ball valve 56b2 in such a manner that an extended line of the axis of the valve stem 56b1 intersects with the center point of the ball valve 56b2. The valve stem 56b1 is inserted into and axially supported by the slide hole 56a5, which pierces the bottom surface of the first cylinder portion 56a1, while being allowed to be slidably movable in a longitudinal direction of the valve housing 56a.

As illustrated in FIG. 2, the valve seat portion 56c includes a valve seat member 56c1 and the valve seat 56c2, which is formed at the valve seat member 56c1. The valve seat member 56c1 is formed in a substantially cylinder shape. The cylinder outer circumferential surface of the valve seat member 56c1 is press-fitted into the cylinder bore 56a4 of the valve housing 56a. The end surface of the press-fitted valve seat member 56c1 located close to the valve seat 56c2 (i.e. at the right side in FIG. 2) is inserted up to nearly the center of the cylinder bore 56a4 and is fixed thereat.

The valve seat 56c2 is formed at a location rearward of the valve seat member 56c1. The through hole 56c3, whose diameter is smaller than the other inner diameter portion of the valve seat member 56c1, is formed at a portion of the valve seat portion 56c where the valve seat 56c2 is formed. The valve seat 56c2 is formed on a tapered surface, which is formed in a frustoconical shape and which is formed between the through hole 56c3 and the rear end surface of the valve seat member 56c1. Alternatively, the valve seat 56c2 is formed at an intersection portion between the through hole 56c3 and the tapered surface.

The ball valve 56b2 contacts the valve seat 56c2 from the rear end surface-side of the valve seat member 56c1, so that the cylinder bore 56a4 is divided into a space (which is hereinafter referred to as a second space 46), which is in communication with the pressure accumulating device 30 and into which the valve body 56b is accommodated, and a space (which is hereinafter referred to as a first space 45), which is connected to the servo pressure generating chamber 57 that is in communication with the servo pressure chamber 10e of the master cylinder 10.

The coil spring 56d biases the ball valve 56b2 toward the valve seat 56c2 and is provided in a compressed manner between the valve body 56b and the bottom surface of the valve housing 56a in the second space 46. The valve body 56b includes a stepped portion on the valve stem 56b1, so that one end surface of the coil spring 56d contacts the stepped portion (see FIG. 2). Accordingly, the ball valve 56b2 contacts and is pressed by the valve seat 56c2 by the biasing force of the coil spring 56d, thereby fluid-tightly separating the first space 45 and the second space 46.

As illustrated in FIG. 2, in the state in which the valve mechanism 56 (the subassembly 80) is provided inside the housing 55, the rear end surface of the flange portion 56a3 of the valve housing 56a contacts a stepped portion, at which the small-diameter portion 55i and the intermediate-diameter portion 55j formed inside of the housing 55 are connected, in order to position the subassembly 80 in the axial direction. While in this state, a predetermined clearance is formed between the rear end surface of the valve housing 56a and the bottom surface of the small-diameter portion 55i of the housing 55. The clearance allows the valve stem 56b1 to be movable beyond the rear end surface of the valve housing 56a in order to ensure the stroke amount of the valve stem 56b1.

The outer circumferential surface of the flange portion 56a3 of the valve housing 56a (the second case 59) is press-fitted into a press-fitting internal circumferential surface, which is formed at the end portion of the first case 58 located close to the opening thereof. Consequently, the space, which is defined by the inner circumferential surface of the first case 58, the outer circumferential surface, the inner circumferential surface and the bottom surface of the body portion 51a of the first piston 51, the outer circumferential surface of the second cylinder portion 56a2 of the valve housing 56a, and the front end surface of the flange portion 56a3, forms the servo pressure generating chamber 57. Accordingly, the servo pressure generating chamber 57 is in communication with the first space 45.

A spring 47 is provided in a compressed state between the bottom surface of the body portion 51a and the front end surface of the flange portion 46a3 inside the servo pressure generating chamber 57 via a spacer provided at a location close to the bottom surface of the body portion 51a. The spring 47 biases the first piston 51 toward the second piston 52.

While the subassembly 80 configured as above is inserted into and the housing 55 and arranged as above, for example rubber O-rings 96 through 102 are provided on the outer circumference of the subassembly 80 in order to fluid-tightly seal the clearance formed between the small-diameter portion 55i and the intermediate-diameter portion 55j of the housing 55. More specifically, each of the O-rings 96 through 102 is provided at a location forward or rearward of each of the communication passages 55c1, 55d1 through 55h1 in order to fluid-tightly connect the port 56a6 formed at the second case 59 and the ports 58d through 58h formed at the first case 58 with the corresponding ports 55c through 55h formed at the housing 55.

A brief explanation about a brake piping will be given below. The ABS (Anti-lock Brake System) 60 having a conventional configuration is connected to the port 10m and the port 10n of the respective first master chamber 10f and the second master chamber 10g, in which the master pressure Pm is generated, of the master cylinder 10 via the respective conduits 61 and 62 and respective normally-open-type on-off valves 62a and 61a. The ABS 60 is connected to each of the wheel cylinders WCfl, WCfr, WCrl and WCrr that actuates the friction brake to brake each of the wheels Wfl, Wfr, Wrl and Wrr.

The configuration of the ABS 60 will be explained here with one of four wheels (for example the front-right wheel Wfr) as an example. The ABS 60 includes a holding valve 60a, a pressure reducing valve 60b, a reservoir 60c, a pump 60d, and a motor 60e. The holding valve 60a is a normally-open-type electromagnetic valve and the opening and closing thereof is controlled by the brake ECU 2. The holding valve 60a is arranged so that one port is connected to the conduit 62 and the other port is connected to the wheel cylinder WCfr and the pressure reducing valve 60b. In other words, the holding valve 60a serves as an input valve for the ABS 60. Since the ABS is well known, a detailed explanation about the operation is not given here.

The brake ECU 2 is an electric control unit including a microprocessor. The microprocessor includes storage sections such as input/output interface, CPU, RAM, ROM, and non-volatile memory, which are respectively connected with one another via bus communication. The CPU executes programs corresponding to a "linear mode" and a "REG mode", which will be described below, and the like. The RAM temporarily stores therein variables necessary for executing the programs. The storage sections store the programs, map data and the like.

The brake ECU 2 is in communication with various sensors 15, 73 through 75 and controls each electromagnetic valve 41, 42, 60a and 60b, the motor 33 and the like. Only the connection between the brake ECU 2 and the stroke sensor 15 is illustrated with the broken line in FIG. 1 as an example, and other connections between the brake ECU 2 on one hand and other sensors 73 through 75, the electromagnetic valves 41, 42, 60a and 60b, and the motor 33 on the other hand are omitted in FIG. 1.

Further, the brake ECU 2 is connected to a hybrid ECU (not shown) so as to be mutually communicable and performs therewith a cooperative control (a regeneration cooperative control) so that the "requested braking force" is equalized with the total value of the "target regeneration braking force" generated by the regeneration brake device and the "target friction braking force" generated by the friction brake device BK. The brake ECU 2 memorizes two control modes, namely the "linear mode" and the "REG mode".

A normal operation under the "linear mode" will be explained below. The "linear mode" is a normal brake control mode, more specifically the "linear mode" is a mode for controlling the pressure decreasing valve 41 and the pressure increasing valve 42 in order to control the "servo pressure Ps" of the servo pressure chamber 10e. While the "linear mode" is executed, the brake ECU 2 calculates the "requested braking force" requested by the vehicle operator based on the operation amount of the brake pedal 4 (the movement amount of the input piston 12) which is detected by the stroke sensor 15. Then, the brake ECU 2 outputs the vehicle operator's "requested braking force" to the hybrid ECU. The brake ECU 2 obtains a target value of the regeneration brake device, i.e. the "target regeneration braking force" from the hybrid ECU, and calculates the "target friction braking force" by subtracting the "target regeneration braking force" from the "requested braking force". Then, the brake ECU 2 controls the pressure reducing valve 41 and the pressure increasing valve 42 of the pilot pressure generating device 40 on the basis of the calculated "target friction braking force" in order to generate the pilot pressure Pp in a predetermined pressure level. The regulator 50 generates the "servo pressure Ps" (=pilot pressure Pp) and applies the generated servo pressure Ps to the servo pressure chamber 10e in order to control the friction braking force generated by the friction brake device BK to be equal to the "target friction braking force".

Accordingly, when the brake pedal 4 is depressed, the brake ECU 2 controls the pressure reducing valve 41 in the valve-closing direction and the pressure increasing valve 42 in the valve-opening direction on the basis of the "target friction braking force".

The communication between the accumulator 31 and the first pilot chamber 53 is established when the pressure increasing valve 42 is opened. On the other hand, when the pressure reducing valve 41 is closed, the first pilot chamber 53 is disconnected from the reservoir 43. The pilot pressure Pp in the first pilot chamber 53 is increased by the high-pressured brake fluid supplied from the accumulator 31. As the pilot pressure Pp increases, the first piston 51 (the control piston 51b) is biased toward the valve mechanism 56, and the control piston 51b is slidably moved toward the bottom surface of the housing body 55a. Accordingly, the tip end of the projection portion 51b2 of the control piston 51b contacts the ball valve 56b2, so that the passage 51b3 of the projection portion 51b2 is closed by the ball valve 56b2, thereby the first space 45 is disconnected from the reservoir 43.

Further, as the control piston 51b is moved toward the bottom surface of the housing body 55a, the projection portion 51b2 presses and moves the ball valve 56b2 toward the bottom surface of the housing body 55a and the ball valve 56b2 is detached from the valve seat 56c2. Accordingly, the communication between the first space 45 and the second space 46 is established via the through hole 56c3 of the valve seat member 56c1. Since the high-pressured brake fluid is supplied to the second space 46 from the accumulator 31, the hydraulic pressure in the first space 45 increases upon the establishment of the communication.

As the distance between the ball valve 56b2 and the valve seat 56c2 increases, a flow passage area of the brake fluid increases, so that a pressure increasing speed of the hydraulic pressure at the flow passage at the downstream of the ball valve 56b2 becomes fast and the responsibility is also improved. When a force, which acts on the first piston 51 and which corresponds to the first space 45, becomes greater than a force corresponding to the pilot pressure Pa, which acts on the first piston 51, as a result of the hydraulic pressure increase in the first space 45, the first piston 51 is slidably moved forward and the first space 45 is disconnected from the second space 46. According to the above-mentioned operation, the hydraulic pressures in the first space 45 and the servo pressure generating chamber 57 are controlled to be in the level of pressure corresponding to the pilot pressure Pa.

Further, as the "target friction braking force" increases, the brake ECU 2 controls the pressure increasing valve 42 in the valve-open direction and the pressure reducing valve 41 in the valve-closing direction in order to increase the pilot pressure Pa in the first pilot chamber 53. In other words, as the "target friction braking force" increases, the pilot pressure Pa increases and the servo pressure Ps, i.e. the hydraulic pressure in the servo pressure chamber 10e also increases.

As a result of the hydraulic pressure increase in the servo pressure chamber 10e, the first master piston 11a is moved forward and the master pressure Pm in the first master chamber 10f increases. Then, the second master piston 11b is also moved forward and the master pressure Pm in the second master chamber 10g increases. In this case, the master pressure Pm in the first master chamber 10f and the master pressure Pm in the second master chamber 10g are controlled to be equal to one another.

As described above, in this embodiment the target servo pressure Ps in the servo pressure chamber 10e is controlled to be equal to the pilot pressure Pp. Furthermore, the master pressure Pm is also controlled to be equal to the pilot pressure Pp (i.e. the servo pressure Ps, the master pressure Pm and the pilot pressure Pp are controlled to be in a relationship of servo pressure Ps=master pressure Pm=pilot pressure Pp).

As the hydraulic pressure in the first master chamber 10f increases, the high-pressured brake fluid is supplied to the ABS 60 from the first master chamber 10f, and the friction brake is actuated to brake the vehicle. While above operation is executed, the brake fluid having the servo pressure Ps (=pilot pressure Pp) is also supplied to the second pilot chamber 54 from the first master chamber 10f. According to the invention, the second piston 52 is formed so that the pressure-receiving surface area B of the end surface 52b1 of the second piston 52, on which the pilot pressure Pp of the first pilot chamber 53 is received, is set to be larger than the pressure-receiving surface are A of the end surface 52a1, on which the pressure from the second pilot chamber 54 is received, while the above-mentioned state is established. Therefore, in the normal state, the second piston 52 is biased toward the second pilot chamber 54 and the second piston 52 is not displaced.

On the other hand, in the case of releasing the brake operation, the brake ECU 2 controls the pressure reducing valve 41 to be in the opened state and the pressure increasing valve 42 to be in the closed state, thereby establishing the communication between the reservoir 43 and the first pilot chamber 53. As a result, the hydraulic pressure in the first pilot chamber 53 is linearly controlled down to the atmospheric pressure level as targeted, and the control piston 51b is biased by the spring 47 to be moved rearward, thereby the friction brake device BK returns to the state before the brake pedal 4 is depressed.

Explained below is the behavior of the master pressure Pm and the pilot pressure Pp in a process (a transitional state) of depressing the brake pedal 4 or in a process (a transitional state) of releasing the depression of the brake pedal 4, and a setting of the pressure-receiving surface area B at the end surface 52b1 and the pressure-receiving surface area A at the end surface 52a1 of the second piston 52.

It is known that, while the first master piston 11a and the second master piston 11b are slidably moved inside the cylinder bore 10b of the master cylinder 10 in response to the depression of the brake pedal 4 or the release of depression of the brake pedal 4, a sliding friction f is generated at the first master piston 11a in the direction opposite to the moving direction of the first master piston 11a (since the second master piston 11b behaves similarly to the first master piston 11a, a detailed explanation of the behavior of the second master piston 11b is omitted hereinafter), and therefore pressure loss ΔP is generated. Hence, in the case where the master pressure Pm is increased by depressing the brake pedal 4 and in the transitional state where the master pressure Pm is reduced by releasing the depression of the brake pedal 4, a phenomenon different from the above-mentioned normal static state occurs, and the relationship between the master pressure Pm and the pilot pressure Pp becomes as expressed by the following equations (equation 1 and equation 2).

In case of pressure increase: $Pm=Pp-\Delta P$ (Equation 1)

In case of pressure reduction: $Pm=Pp+\Delta P$ (Equation 2)

Accordingly, in the case where the master pressure Pm and the pilot pressure Pp are controlled to become equal (i.e. master pressure Pm=pilot pressure Pp) as in this embodiment, the pilot pressure Pp may become lower than the master pressure Pm (i.e. pilot pressure Pp<master pressure Pm) while the pressure is reduced (i.e. in the transitional state). Illustrated in FIG. 4 are specific examples of transitional characteristics of the master pressure Pm (see the broken line) and transitional characteristics of the pilot pressure Pp (see the solid line) in the case of depressing and releasing the brake pedal 4 (the vertical axis represents a hydraulic pressure P and the horizontal axis represents time "t").

Figure 4:
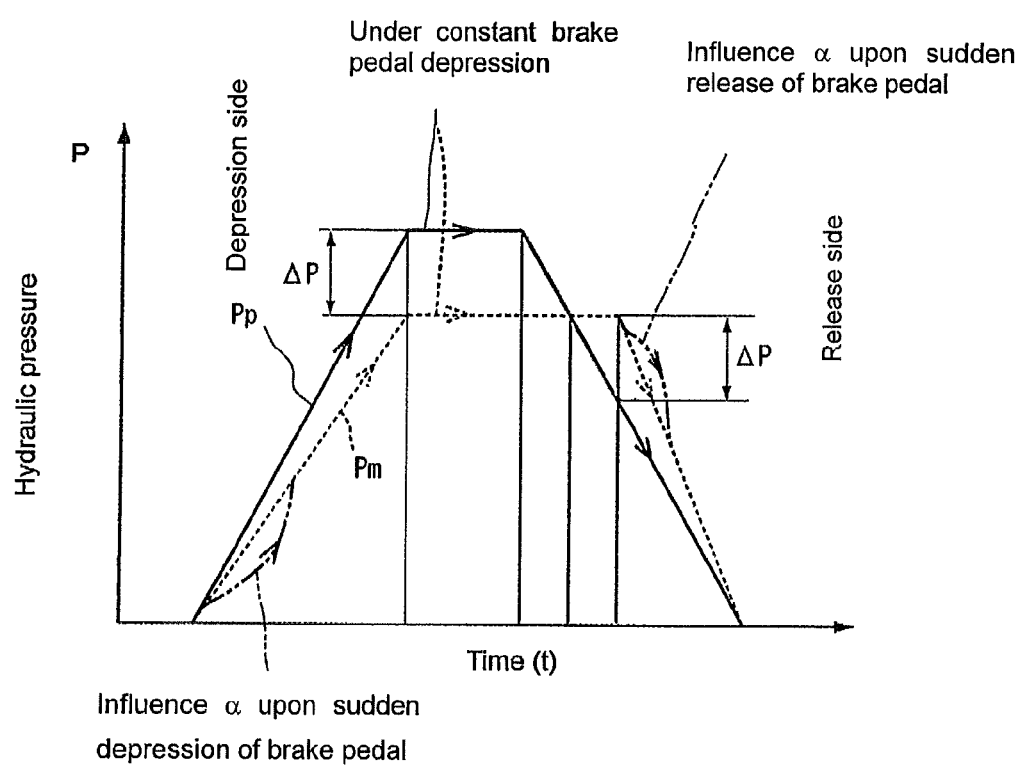
FIG. 4 is a graph illustrating behavior of a pilot pressure Pp and a master pressure Pm (a hydraulic pressure with reference to time) in the case where a brake pedal is depressed and in the case where the brake pedal is released from depressing.

As is evident from FIG. 4, while the pressure increases (while in the transitional state) (see the left-side part of the graph in FIG. 4), the pressure loss ΔP generated due to the sliding friction f acts in a direction by which the master pressure Pm is reduced, therefore the pilot pressure Pp is always greater than the master pressure Pm (pilot pressure Pp>master pressure Pm) without being influenced by the depression speed of the brake pedal 4. Hence, the relationship between the biasing force Fp and Fm, which bias the second piston 52 having the small-diameter columnar portion 52a including the pressure-receiving surface area A receiving the master pressure Pm and the large-diameter columnar portion 52b including the pressure-receiving surface area B formed to be larger than the small-diameter columnar portion 52a and receiving the pilot pressure Pp in the axial direction, becomes such that the biasing force Fp is always greater than the biasing force Fm (i.e. biasing force Fp>biasing force Fm). Therefore, while the master pressure Pm is increased and when the increase of the master pressure Pm is completed, the second piston 52 is not pushed to move toward the first pilot chamber 53, therefore no influence interferes with the servo pressure Ps.

Next, the case where the master pressure Pm is reduced (i.e. the transitional state) will be explained below. In the case of the pressure reduction (i.e. the transitional state), the pilot pressure Pp may become lower than the master pressure Pm (pilot pressure Pp<master pressure Pm) as illustrated at the right-side part of the graph in FIG. 4 because of the pressure loss ΔP generated by the sliding friction f of the first master piston 11a.

In this case, when both of the end surfaces (the pressure-receiving surfaces) of the second piston 52 of the regulator 50 are formed to have the same diameter as is described in the known technology, the biasing force Fm applied to the surface receiving the master pressure Pm becomes greater than the biasing force Fp applied to the surface receiving the pilot pressure Pp. As a result, the second piston 52 is displaced toward the first piston 51, which may influence the servo pressure Ps.

Figure 5:
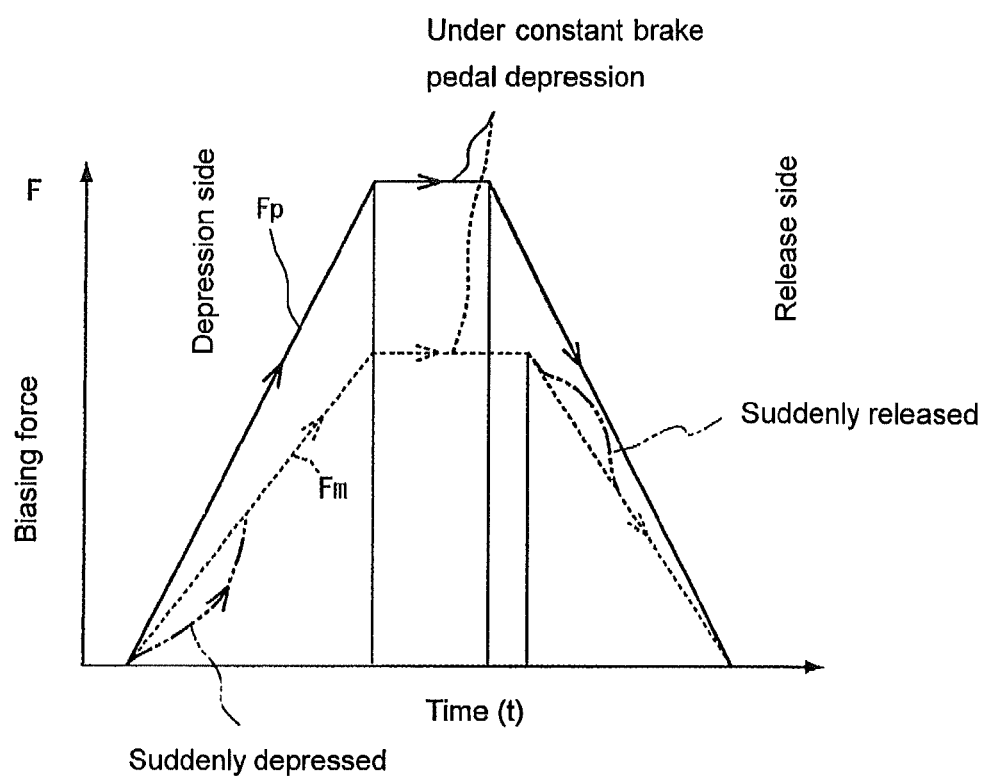
FIG. 5 is a graph illustrating behavior of the biasing force Fm and Fp (the biasing force with reference to time) applied to the second piston according to the embodiment of the invention in the case where the brake pedal is depressed and in the case where the brake pedal is released from depressing.

However, according to the invention, the stepped portion is formed on the second piston 52 in the cylinder axial direction so that the pressure-receiving surface area B of the large-diameter columnar portion 52b receiving the pilot pressure Pp is larger than the pressure-receiving surface area A of the small-diameter columnar portion 52a receiving the master pressure Pm. In this case, the difference between the pressure-receiving surface area A and the pressure-receiving surface area B is set so that the biasing force Fp and the biasing force Fm applied to the second piston 52 upon receiving the pilot pressure Pp and the master pressure Pm satisfy characteristics shown in FIG. 5 (specifically the right-side of FIG. 5, i.e. characteristics obtained when the releasing operation is conducted). In other words, the difference between the outer diameter of the small-diameter columnar portion 52a (i.e. the pressure-receiving surface area A) and the outer diameter of the large-diameter columnar portion 52b (i.e. the pressure-receiving surface area B) is set so that the biasing force Fp is always greater than the biasing force Fm even in the case where the master pressure Pm becomes larger than the pilot pressure Pp because of releasing the depression to the brake pedal 4 and the difference between the master pressure Pm and the pilot pressure Pp reaches the maximum under an actual use. Accordingly, the biasing force Fp is always kept greater than the biasing force Fm (i.e. biasing force Fp>biasing force Fm) even in the process of reducing the master pressure Pm, therefore the second piston 52 is not likely to be displaced toward the first piston 51 to influence the servo pressure Ps. The master pressure Pm and the pilot pressure Pp in the process of releasing the brake pedal 4, which are used as the basis for setting the pressure-receiving surface area A and the pressure-receiving surface area B, may be obtained on the basis of an experimental value or a calculated value.

The "REG mode" will be briefly explained below. The "REG mode" is a mode in which the pressure reducing valve 41 and the pressure increasing valve 42 are controlled to be in a non-excited state or a mode to be executed when the pressure reducing valve 41 and the pressure increasing valve 42 are turned to be in the non-excited state (keeping the normal state) because of a failure or the like. When the "REG mode" is executed, the pressure reducing valve 41 and the pressure increasing valve 42 are not excited (not controlled), so that the pressure reducing valve 41 is kept to be in the open state and the pressure increasing valve 42 is kept to be in the closed state. Such non-excited state (non-controlled state) is kept even after the brake pedal 4 is depressed.

When the brake pedal 4 is depressed while the "REG mode" is executed, the input piston 12 is moved forward and eventually the front end surface of the input piston 12 contacts the rear end surface of the first master piston 11a, thereby the first master piston 11a is moved forward. In this case, because the pressure reducing valve 41 and the pressure increasing valve 42 are not energized, the servo pressure is not controlled. In other words, the first master piston 11a is moved forward only by the force corresponding to the operation force applied to the brake pedal 4.

When the first master piston 11a is moved forward, as similar to the "linear mode", the hydraulic pressures in the first master chamber 10f and the second master chamber 10g increase. Then, the hydraulic pressure in the second pilot chamber 54 also increases in response to the increase of the hydraulic pressure in the first master chamber 10f. The second piston 52 is slidably moved toward the bottom surface of the housing body 55a while pressing and moving the first piston 51 in response to the increase of the hydraulic pressure in the second pilot chamber 54. Simultaneously, the projection portion 51b2 of the control piston 51b is slidably moved toward the bottom surface of the housing body 55a. Accordingly, the projection portion 51b2 contacts the ball valve 56b2 and closes the opening end of the passage 51b3, which extends through the inside of the projection portion 51b2, thereby the first space 45 (i.e. the servo pressure generating chamber 57) is disconnected from the reservoir 43. Further, the projection portion 51b2 presses and moves the ball valve 56b2, and the ball valve 56b2 is pressed to move toward the bottom surface of the housing body 55a. Accordingly, the communication between the first space 45 and the second space 46 is established, and the brake fluid, which is pressurized to have the high pressure by the accumulator 31, is supplied to the servo pressure chamber 10e via the servo pressure generating chamber 57.

As described above, under the "REG mode", the communication between the accumulator 31 and the servo pressure chamber 10e is established when the brake pedal 4 is depressed for a predetermined stroke by the operation force applied thereto, and the servo pressure may be increased without positive controlling. Therefore, the first master piston 11a may be moved further forward than a distance the first master piston 11a is moved only by the operation force applied by the vehicle operator. Accordingly, the high-pressure brake fluid may be supplied to the ABS 60 even when each electromagnetic valve is in the non-excited state.

Additionally, the second piston 52 includes the stepped portion on the outer circumferential surface thereof, and the small-diameter columnar portion 52a and the large-diameter columnar portion 52b are provided with the seal members 81 and 82 respectively in order to fluid-tightly seal the clearances formed between the inner circumferential surface of the first case 58 on one hand and the small-diameter columnar portion 52a and the large-diameter columnar portion 52b on the other hand. Further, the intermediate atmospheric pressure chamber 52c, which is in communication with the reservoir 43, is formed between the seal members 81 and 82 in the axial direction.

Accordingly, while the brake device BK for the vehicle is in operation, the predetermined pilot pressure Pp may be generated in the first pilot chamber 53 by a normal sealing function of the seal member 82, which seals the clearance formed between the large-diameter columnar portion 52b and the inner circumferential surface of the first case 58, even if for example the sealing function of the seal member 81 is weakened. Therefore, the normal servo pressure Ps is supplied to the servo pressure chamber 10e and the predetermined master pressure Pm is generated in the second master chamber 10g. Hence, even though the total braking force decreases, sufficient braking force is ensured and therefore safety is secured. In the above-described case, the brake fluid leaks from the seal member 81 and the second pilot chamber 54 is connected to the reservoir 43. Therefore, generating the predetermined master pressure Pm in the first master chamber 10f becomes difficult. Hence, the hydraulic pressure of the first master chamber 10f may be monitored to detect the weakening of the sealing function of the seal member 81 in order to respond to such situation in an early stage.

On the other hand, for example in the case where the sealing function of the seal member 82, which seals the clearance formed between the small-diameter columnar portion 52a and the inner circumferential surface of the first case 58, is weakened, the predetermined pilot pressure Pp cannot be generated in the first pilot chamber 53, and therefore the servo pressure Ps is not generated by the pilot pressure Pp. However, the master pressure Pm corresponding to the operation force applied to the brake pedal 4 when the vehicle operator depresses the brake pedal 4 is generated (which is explained above for the "REG mode") in the first pilot chamber 53 by the normal sealing function of the seal member 81. Accordingly, the master pressure Pm presses and moves the second piston 52 and the first piston 51 by which the servo pressure Ps is generated, therefore the predetermined master pressure Pm is generated. As a result, the braking force is ensured and the safety is assured.

In the above-described situation, even though the pilot pressure generating device 40 is normally operated, the brake fluid within the first pilot chamber 53 leaks from the seal member 82 and the communication between the first pilot chamber 53 and the reservoir 43 is established, which makes the generation of the pilot pressure Pp in the predetermined pressure level difficult. Hence, the hydraulic pressure inside the first pilot chamber 53 may be monitored to detect the weakening of the sealing function of the seal member 82 in order to respond to such situation in an early stage. Accordingly, because two seal members namely the seal member 81 and the seal member 82 are provided via the intermediate atmospheric pressure chamber 52c, a significant deterioration of the brake function is not likely to occur even when the sealing function of one seal member is weakened, and therefore reliability of the brake device BK may be increased.

As is evident from the above explanation, according to the regulator 50 of the embodiment, the end surface 52b1 of the large-diameter columnar portion 52b of the second piston 52, which is exposed to the first pilot chamber 53 and on which the pilot pressure Pp is applied, is formed to have a larger pressure-receiving surface area than the end surface 52a1 of the small-diameter columnar portion 52a of the second piston 52, which is exposed to the second pilot chamber 54 and on which the master pressure Pm is applied. Accordingly, even when a phenomenon in which the master pressure Pm becomes greater than the pilot pressure Pp occurs, the second piston 52 is moved toward the first piston 51 by the pressure difference between the master pressure Pm and the pilot pressure Pp, so that the generation of the servo pressure Ps is not disturbed.

In the above-described embodiment, the difference between the pressure-receiving surface area B of the end surface 52b1 of the large-diameter columnar portion 52b of the second piston 52 exposed to the first pilot chamber 53 and the pressure-receiving surface area A of the end surface 52a1 of the small-diameter columnar portion 52a of the second piston 52 exposed to the second pilot chamber 54 is set so that the second piston 52 is not moved toward the first piston 51 even when the phenomenon in which the master pressure Pm becomes greater than the pilot pressure Pp occurs such as when the brake operation is released. Accordingly, the generation of the servo pressure Ps is not disturbed by the second piston 52 being moved toward the first piston 51 because of the pressure difference between the master pressure Pm and the pilot pressure Pp.

Furthermore, in this embodiment, the second piston 52, the first piston 51 and the like configuring the regulator 50 are assembled to the first and second cases 58 and 59 as a unit, and the assembled unit is inserted into the housing 55 thereby configuring the regulator 50. Accordingly, the assembly of the regulator 50 may be simplified, which may contribute to reduce manufacturing costs.

In the above-described embodiment, the sliding friction f generated between the first master piston 11a and the cylinder bore 10b is explained as an example of a reason for fluctuation of the master pressure Pm in the process of depressing the brake pedal 4 and in the process of releasing the brake pedal 4, as is shown in FIG. 4. However, it is also known that fluctuation occurs for the master pressure Pm because of the viscosity of the brake fluid in addition to the sliding friction f as shown with the two-dot chain line in FIG. 4 in the case where the brake pedal 4 is suddenly released. An influence α appears in the same direction as the sliding friction f as shown in the following equations 3 and 4. The influence α (and the pressure loss ΔP) appears in the minus-side when the brake pedal 4 is depressed so as to reduce the master pressure Pm. On the other hand, when the depression to the brake pedal 4 is released, the influence α (and the pressure loss ΔP) appears in the increase-side so as to increase the master pressure Pm.

In case of pressure increase: $Pm=Pp-\Delta P-\alpha$      (Equation 3)

In case of pressure reduction: $Pm=Pp+\Delta P+\alpha$      (Equation 4)

Accordingly, in this embodiment, the outer diameter of the small-diameter columnar portion 52a (i.e. the pressure-receiving surface area A) and the outer diameter of the large-diameter columnar portion 52b (i.e. the pressure-receiving surface area B) may be set so that the biasing force Fp (=Pp*B) becomes greater than the biasing force Fm (=(Pp=ΔP+α)*A) in the case the situation in which the brake pedal 4 is suddenly released is also taken into consideration. Hence, even while the master pressure Pm is reduced in response to the sudden release of the brake pedal 4, the biasing force Fp is always controlled to be greater than the biasing force Fm (biasing force Fp>biasing force Fm), therefore the second piston 52 is not moved toward the first piston 51 and no influence interferes with the servo pressure Ps.

In the above-explained embodiment, the brake ECU 2 calculates the "requested braking force" based only on the movement amount (the operation amount) of the input piston 12 and then calculates the "target friction braking force". However, the brake ECU 2 may be modified to detect the reaction force of the reaction force generating device 20 in addition to the movement amount of the input piston 12 and calculate the "requested braking force" with the reaction force taken into account as well, and then calculate the "target friction braking force".

In the above-explained embodiment, the stroke sensor 15 detecting the movement amount of the input piston 12 is provided in the vicinity of the brake pedal 4 and detects the stroke amount of the brake pedal 4. Alternatively, the stroke sensor 15 may be provided in the vicinity of the input piston 12 and may directly detect the movement amount (i.e. the stroke amount, the operation amount) of the input piston 12.

Further, in the above-explained embodiment, the brake pedal 4 is used as a member for transmitting the operation force applied by the vehicle operator to the input piston 12. However, the member for transmitting the operation force is not limited to the brake pedal 4. For example, a brake lever, a brake handle or the like may be used as the member for transmitting the operation force. Even when the braking device for the vehicle (the friction brake device BK) according to the embodiment is adapted to for example a motorcycle and other vehicles, the technical thoughts of the invention are applicable to any vehicle.

In this embodiment, the second pilot chamber 54, the second piston 52, the first pilot chamber 53 and the first piston 51 are accommodated within the first case 58 in this order from the bottom surface thereof. The valve mechanism 56 is configured by the second case 59, which also serves as the valve housing 56a of the vale mechanism 56. The opening of the first case 58 and the second case 59 are unitary fixed to form the subassembly 80. The subassembly 80 is inserted into the housing 55, thereby forming the regulator 50. However, the regulator 50 may be configured in such a manner that the second pilot chamber 54, the second piston 52, the first pilot chamber 53, the first piston 51, and the valve mechanism 56 are directly accommodated within the housing 55 in this order without using the first case 58. In this case, the stepped portion formed inside the first case 58 at the location corresponding to the stepped portion formed on the outer circumference of the second piston 52 may be formed on the inner circumferential surface of the housing 55. Accordingly, in this case, because the first case 58 is not necessary, the manufacturing costs may be significantly reduced.

The invention claimed is:

1. A braking device for a vehicle, comprising:
   a cylinder;
   a master piston provided inside the cylinder while being allowed to be slidably movable therein in an axial direction and having a pressure applying piston portion defining a master chamber, in which a brake fluid is pressurized, with an inner circumferential surface of the cylinder, and a servo pressure receiving portion defining a servo pressure chamber with the inner circumferential surface of the cylinder;
   an input piston arranged inside of the cylinder at a rear-side thereof while being allowed to be slidably movable in the axial direction and to be distanced away from a rear end surface of the master piston for a predetermined distance;
   a pressure accumulating device accumulating a pressure of the brake fluid;
   a pilot pressure generating device generating a pilot pressure corresponding to an operation amount of the input piston by using the brake fluid of the pressure accumulating device; and
   a regulator having a first piston fitted into a housing while being allowed to be slidably movable therein and dividing an inside of the housing into a first pilot chamber in communication with the pilot pressure generating device and a servo pressure generating chamber in communication with the servo pressure chamber, a valve mechanism that is configured to connect the servo pressure generating chamber with the pressure accumulating device or a reservoir in response to a movement of the first piston, and a second piston fitted into the housing while being allowed to contact and detach from the first piston and dividing the inside of the housing into the first pilot chamber and a second pilot chamber in communication with the master chamber, wherein the second piston is formed so that an end surface thereof exposed to the first pilot chamber has a larger pressure-receiving surface area than an end surface exposed to the second pilot chamber.

2. The braking device for the vehicle according to claim 1, wherein a difference between a pressure-receiving surface area of the end surface of the second piston exposed to the first pilot chamber and a pressure-receiving surface area of the end surface of the second piston exposed to the second pilot chamber is set so that the second piston is not moved toward the first piston even when a master pressure becomes greater than the pilot pressure due to a movement of the master piston in a direction by which the master pressure is reduced and due to an influence of a sliding friction generated between the master piston and the cylinder.

3. The braking device for the vehicle according to claim 1, wherein the regulator includes:

a first case formed in a bottomed cylinder shape having an opening at one end thereof, and accommodating therein the second pilot chamber, the second piston, the first pilot chamber and the first piston in this order from a bottom surface of the first case; and a second case fixed at the opening of the first case, defining the servo pressure generating chamber together with the first case and the first piston, and having the valve mechanism inside of the second case, wherein the first and second cases are formed as a unit and assembled inside of the housing.

\* \* \* \* \*